April 7, 1931.  G. CROMPTON, JR  1,799,733

AEROPLANE

Filed Dec. 30, 1929

Inventor:
George Crompton Jr.
By Geo. H. Kennedy Jr.
Attorney

Patented Apr. 7, 1931

1,799,733

UNITED STATES PATENT OFFICE

GEORGE CROMPTON, JR., OF WORCESTER, MASSACHUSETTS

AEROPLANE

Application filed December 30, 1929. Serial No. 417,445.

The invention relates to aeroplanes, particularly of the type described in my prior Patent No. 1,716,116, granted June 4, 1929. In that patent there is described an aeroplane having a revoluble main plane, which is journalled on a transverse axis, there being a lock and brake mechanism to hold the said plane from rotation during normal flight. The plane illustrated in the said patent was symmetrical in cross section so that the forward portion was always concave on the under side, and convex on the upper side, this shape being adopted so that it would revolve quickly, and only in one direction.
I have found that the chief utility for an aeroplane of this description lies in the fact that an excessive landing speed can be quickly reduced without creating any force tending to cause the plane to nose over. In other words, a rotating main plane constitutes an aerodynamic brake, which will prevent many crashes on the ground, either just after the landing wheels have made contact, or just before a take-off, when the pilot finds he has not power enough to clear some obstruction. Also, with an aeroplane constructed according to the aforesaid patent, it is possible to make a landing with a speed considerably in excess of the minimum flying speed. Thus excessive flying over-run can be largely eliminated, and the aeroplane can land in a much smaller cleared area.

With the above considered as the chief utility of the aeroplane of the prior invention referred to, I have found that the relative aerodynamic efficiency of various types of planes while rotating became of comparatively small importance. The aerodynamic efficiency in normal flight of the various wing cambers remained, however, of the utmost importance. A wing of the type shown in the prior patent referred to is capable of flight, but the lift-drag coefficient is not good. On the other hand a normal efficient wing will rotate, provided it is started, and with the qualification that it will rotate in either direction.

The main object of the present invention is to provide an aeroplane of the type referred to with a rotatable plane of normal wing camber, and with means for starting the plane in rotation in the correct direction, and for preventing it from rotating in the wrong direction. Another object of the invention is to make the starting means as simple as possible, and to that end it is herein shown as incorporated with the lock and brake mechanism. Under certain circumstances the means for preventing the plane from rotating in the wrong direction may suffice, and this means is shown herein simply as a ratchet and pawl, the provision of which is another object of the invention.

According to the prior and the present inventions, an aeroplane is adapted to land at high speeds. Normally this would tend to cause bouncing, but due to the fact that the lift is greatly reduced at the moment that the plane is allowed to revolve, bouncing is largely eliminated. Nevertheless there is apt at times to be some contact between the wing tips and the ground, and were the wings unprotected, the wing tips would probably be smashed. To prevent or minimize this the wing tips, according to one phase of the present invention, are provided with protecting hoops.

The above and other advantageous features of the invention will hereinafter more fully appear from the following detailed description, taken in connection with the accompanying drawings, in which:—

Like reference characters refer to like parts throughout the drawings.

Figure 1:
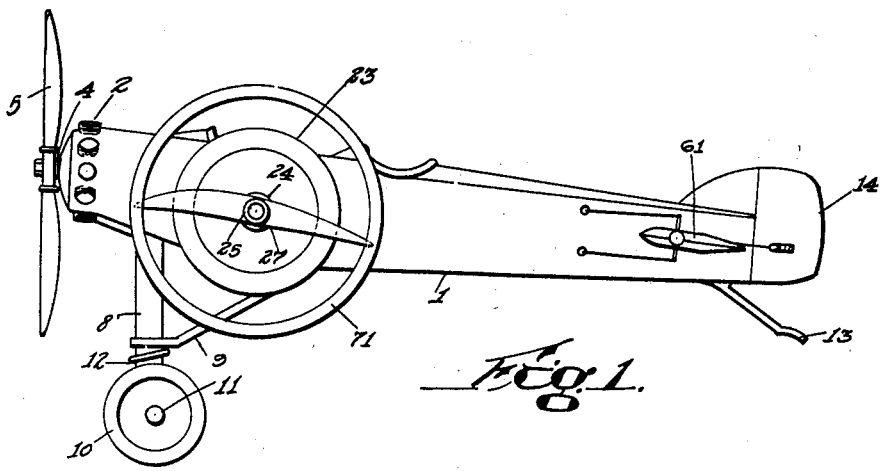
Fig. 1 is a side elevation of an aeroplane constructed in accordance with the present invention.

Referring first to Fig. 1, the aeroplane preferably has a fuselage 1 of a common type, in the front part of which is mounted an engine 2. On the propeller shaft 4 is the usual propeller or screw 5. The running and landing gear comprises the usual vertical struts 8 and braces 9, which support a pair of wheels 10, on an axle 11, a shock absorbing device 12 being desirably placed between the axle 11 and struts 8. At the rear of the aeroplane is the usual tail skid 13.

Figure 2:
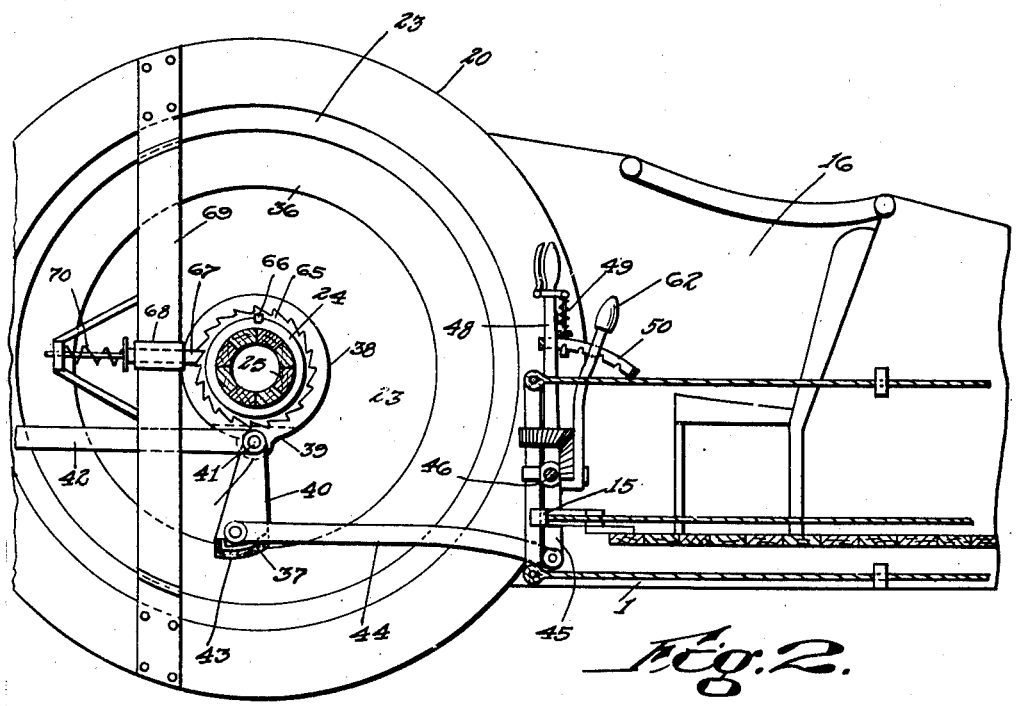
Fig. 2 is a longitudinal sectional view through the fuselage and the shaft on which the rotatable plane is constructed, showing the controlling mechanism for the rotatable plane, and the stabilizing and rudder controls.

Referring to Figs. 1 and 2, the plane is steered laterally by the usual vertical rudder 14, actuated by a foot rudder bar 15 from the pilot's cockpit 16. The structure so far set forth is all well known, but I have described and illustrated it in order to disclose the best manner now known to me of putting my invention into practice.

In my prior patent referred to is described and illustrated how a pair of annular members 20 may be fastened to the fuselage 1. It is not necessary to repeat this description and illustration here, nor is it necessary to describe and illustrate how a pair of disc-like members 23, 23 are journalled in the annular members 20. The above and other details of construction will all be found fully disclosed in my prior patent, to which reference may be made. Suffice it to say that, as in the prior patent, the disc-like members 23, 23 provide hub portions 24, 24, through which extends a hollow shaft 25, preferably made of laminated wood. In this manner the shaft 25 is rotatably mounted in the fuselage 1, being firmly supported against either endwise or radial displacement.

The aeroplane is of the monoplane type—structurally speaking, however, there is a right wing and a left wing. Said wings 27 are exactly similar and are built on the hollow shaft 25. They may be constructed on the shaft in any suitable manner, such as that indicated in my prior patent referred to, but they are not of the shape shown in said patent, their cross-sectional shape or camber being entirely normal, as illustrated in Fig. 1. Of course I do not thereby intend to limit the shape of the wings to that shown in Fig. 1, the intention being simply to indicate a wing of good aerodynamic efficiency.

As in my prior patent, in order to hold the wings rigid for normal flight, a lock and brake mechanism is provided. The lock and brake mechanism herein shown differs slightly in construction from that of my prior patent, and it also has an additional function. As shown in Fig. 2, the discs 23 provide brake drum portions 36, in each of which there is a depression 37. The inwardly extending sides of the hubs 24 provide bearing surfaces for a pair of collars 38, which have forked portions 39 on one side. Brake members 40 are pivotally connected to the collars 38 at the forked portions 39 by pins 41. Links 42 connect some stationary portion of the apparatus (desirably the annular members 20) with the pins 41, and thus prevent the collars 38 from turning on the hubs 24. The provision of the collars 38, the pins 41, and the links 42 is simply a convenient way of establishing a stationary pivot point for the brake members 40 inside a normally stationary but sometimes rotating part, viz., the disc members 23.

As in my prior patent, the brake members 40 are adapted to normally hold stationary the discs 23, brake shoes 43 being normally held in the slots 37 for this purpose. According to the present invention, however, the movement of the brake members 40 to release the discs 23 is adapted to impart a slight turning movement to said discs in a clockwise direction, as shown in Fig. 2. To that end the upper ends of the brake members 40 are stationarily mounted on the pivot pins 41 as already described, while movement is imparted to the brake members 40 near the lower ends.

Actuation of the brake members 40 is effected by links 44. These links 44 are attached at one end to the brake members 40, and at the other end to lever portions 45. The lever portion 45 at the right hand side of the machine, constitutes simply the bottom of a hand lever 48 which is fastened to a suitable cross shaft 46, the cross shaft being mounted in bearings, not shown. On the left hand side of the machine, which is not depicted in the drawings, the lever 45 is simply an arm fastened to the shaft 46. That is to say, the upper hand lever portion 48 is omitted at the left hand side of the machine, as one control for this mechanism is sufficient. The hand lever 48 provides a grip operated rod 49 with a dagger on the lower end cooperating with a slotted segment 50 that is fastened to any suitable part of the machine at the right hand side of the cockpit.

The present invention has nothing to do with the control of the aeroplane in a vertical plane, nor with the maintenance of lateral stability, and such control may be effected, as in my prior patent, by synchronous or differential actuation of tail planes 61, or it may be effected in any other suitable manner. Desirably this control is embodied in a stick 62, the use of which is fully understood in the art, but the adaptation of which to the special kind of lateral stabilization means shown in my prior patent is partly according to Patent No. 1,110,895 to H. L. Coakley, dated September 15, 1914, and is partly the subject matter of my copending application filed Apr. 9, 1930, Serial No. 442,931.

As aforesaid, I have found that a wing of the shape shown in Fig. 1 will rotate if allowed to do so and if started slightly in the proper direction. Nevertheless such a wing or plane will rotate equally well in the wrong direction. While the brake control apparatus described herein, when released, is adapted to urge the disc 23 in a clockwise direction and therefore to insure rotation of the wings 27 with the leading edges moving upward, which is the proper way, I desire to make it sure that these wings will not rotate in the wrong direction, in case the slight turning movement is more than overcome by a sudden down draft of air or by some other cause. Therefore, the present invention provides means for positively preventing the planes from rotating with the leading edge moving downwardly.

Referring to Fig. 2, ratchet wheels 65 are fastened, by means of keys 66 to the inside hub portions 24. Cooperating with these ratchet wheels 65 are pawls 67 each mounted slidably in a bearing portion 68 provided by a vertical member 69 that is attached to some stationary part of the machine, conveniently to the annular members 20. Springs 70 urge the pawls into engagement with the ratchet wheels 65. It will be thus evident that the planes 27 can only rotate with the leading edges moving upward.

In the foregoing description and illustration of the invention, it must be understood that while Fig. 2 shows but one disc 23, there is another on the opposite side of the fuselage, and the parts shown in Fig. 2 and described herein are all duplicated on the other side, with the exception of the hand lever 48 and its associated parts. The central shaft 25 is thus held in fixed position during normal flight by a duplicate mechanism on the opposite sides of the aeroplane, and such duplicate mechanism is adapted to be released by operation of the single lever 48. It is not believed necessary to show this mechanism in duplicate in view of the detailed showing in my prior patent referred to, which shows several views illustrating the arrangement of this general type of mechanism in a fuselage.

At the ends of the wings 27 are fastened hoop members 71. These hoop members may be suitably stream lined for normal flight both at the front and the back, and they may be fastened to the wings 27 in any suitable manner. They may be reinforced by radial wires or spokes running to a hub on the end of the shaft 25, if desired. The use thereof will be presently set forth.

The aeroplane takes off and flies through the air in the normal manner, just as described in my former patent. During such flight the hand lever 48 will be forward, and the brake members 40 will be in the position shown in Fig. 2, holding the brake shoes firmly in the slots 37, and thus preventing rotation of the brake drums 36 and the discs 23 of which they form a part, and therefore holding stationary the shaft 25 and the wings 27. It will be understood that the wings 27 may be directly braced from the discs 23 at the inner portions of said wings.

When the pilot wishes to release the wings 27 for rotation, which generally would be done when a few feet off the ground and about to land, he pulls the lever 48 towards him sharply. This action throws both the links 44 forward, and moves the brake members 40 in a clockwise direction, Fig. 2. Since the brake members 40 are not pivoted at the axis of the shaft 25, they will ultimately leave the slots 37, but before so doing they will have carried the discs 23 a considerable direction clockwise, Fig. 2. The shape of the brake shoes 43 and the slots 37 will be particularly noted, the front portion of the slots being the deepest. Thus, when the wings are released, they will be carried a limited distance in the right direction in the act of so doing.

The wings 27 will therefore start revolving with the leading edges moving upwardly, and will be positively prevented from moving in the other direction by the ratchets and pawls 65, 67. Once an exaggerated angle of incidence is established, the wings will continue to revolve, and this will rapidly check the forward motion of the aeroplane. The lift does not, when the wings start revolving, drop off to zero, but it does drop off sharply, which will let the aeroplane down immediately onto the ground, and prevent bouncing. It is particularly noted that an aeroplane can land in this summer at greater than the minimum flying speed, and that the speed is quickly reduced by this aerodynamic brake which acts to hold the plane firmly on the ground and definitely prevents it from nosing over, since the dragging force is applied at least substantially as high as the center of gravity.

It will be seen that the tips of the wings 27, in rotating, describe a circle, the lowest part of which is a great deal nearer to the ground than the lowest part of the wings when held in normal position. Therefore, there is some danger of these wing tips coming in contact with the ground and being smashed, but the provision of the hoop 71 protects the wings from mishap under normal conditions. It will be understood that the lock and brake mechanism herein described can be used to reestablish the wings 27 in normal position as shown in Fig. 1, either with the aeroplane on the ground or in the air, as in my prior patent.

I claim,

1. In an aeroplane, the combination with a fuselage, and a main plane freely rotatable on a transverse axis, of brake means for controlling the rotation of said main plane, and means incorporated into said brake means to start the rotation of said main plane with the leading edge moving upwardly when said brake is released.

2. In an aeroplane, the combination with a fuselage, and a main plane freely rotatable on a transverse axis, of brake means for controlling the rotation of said main plane, and mechanical means for preventing said main plane from moving except with its leading edge moving upwardly when said brake means is released.

3. In an aeroplane, the combination with a fuselage, and a main plane freely rotatable upon a transverse axis, of brake means for controlling the rotation of said main plane, means incorporated into said brake means for giving said main plane a slight angular movement with its leading edge moving upwardly when said brake means is released, and mechanical means for preventing at all events rotation of said main plane in the other direction.

4. In an aeroplane, the combination with a fuselage, and a main plane freely rotatable on a transverse axis, of brake means for controlling the rotation of said main plane, means for giving said main plane an angular movement with its leading edge moving upwardly, and mechanical means for preventing said main plane from moving in the other direction.

5. In an aeroplane, a fuselage, a main plane of normal wing camber freely rotatable on a transverse axis, and a ratchet and pawl for controlling the rotation of said main plane.

6. In an aeroplane, a fuselage, a main plane of normal wing camber freely rotatable on a transverse axis, brake means for normally preventing the rotation of said main plane, and means for insuring the rotation of said plane, when released, with the leading edge moving upwardly.

7. In an aeroplane, a fuselage, a main plane of normal wing camber freely rotatable on a transverse axis, brake means for normally preventing the rotation of said main plane, and mechanical means for preventing at all events the rotation of said plane with the leading edge moving downwardly.

8. In an aeroplane, a fuselage, a main plane of normal wing camber freely rotatable on a transverse axis, brake means for normally preventing the rotation of said main plane, and means for starting said plane in rotation with the leading edge moving upwardly.

9. An aeroplane as claimed in claim 8, having the brake means and the means for starting the rotation of the plane incorporated in a single mechanism.

10. In an aeroplane, a fuselage, a main plane freely rotatable on a transverse axis, and means at the opposite ends of said plane to protect said plane from injury by contact to the ground.

11. In an aeroplane, a fuselage, a main plane freely rotatable on a transverse axis, and circular members attached to the ends of said main plane.

GEORGE CROMPTON, Jr.